United States Patent [19]
Hjalmarsson

[11] Patent Number: 4,944,148
[45] Date of Patent: Jul. 31, 1990

[54] METHOD AND A DEVICE FOR COOLING OF A PFBC POWER PLANT AFTER A GAS TURBINE TRIP

[75] Inventor: Lennart Hjalmarsson, Finspong, Sweden

[73] Assignee: ABB Stal AB, Sweden

[21] Appl. No.: 289,271

[22] Filed: Dec. 23, 1988

[30] Foreign Application Priority Data

Dec. 23, 1987 [SE] Sweden .................. 8705152

[51] Int. Cl.⁵ .............................................. F02C 3/26
[52] U.S. Cl. .................................. 60/39.02; 60/39.464
[58] Field of Search ............... 60/39.02, 39.12, 39.464; 110/263, 265, 266, 347; 122/4 D; 431/170

[56] References Cited

U.S. PATENT DOCUMENTS 4,306,411 12/1981 Zoll .
4,380,147 4/1983 Zaba .................. 60/39.464
4,498,285 2/1985 Kreij .................. 60/39.464
4,498,286 2/1985 Brannstrom .......... 60/39.464
4,656,972 4/1987 Shimoda ............... 122/4 D
4,744,212 5/1988 Andersson et al. ..... 60/39.464

FOREIGN PATENT DOCUMENTS 0063173 10/1982 European Pat. Off. .

Primary Examiner—Louis J. Casaregola
Attorney, Agent, or Firm—Pollock, Vande Sande & Priddy

[57] ABSTRACT

A method of discharging heat from a particulate material in a bed (28) of a combustor (12) in the event of an operational disturbance in a PFBC power plant. Gas from the combustor (12) is cooled in a cooling circuit (69) connected to the combustor (12) and is returned to the combustor (12) where it is allowed to pass through the bed (28). A device for carrying out the method comprises a cooling circuit (69), connected to the combustor (12), with a cooler (72) and a compressor or fan (76) which effects gas circulation through the cooling circuit (69) and the combustor (12).

3 Claims, 1 Drawing Sheet

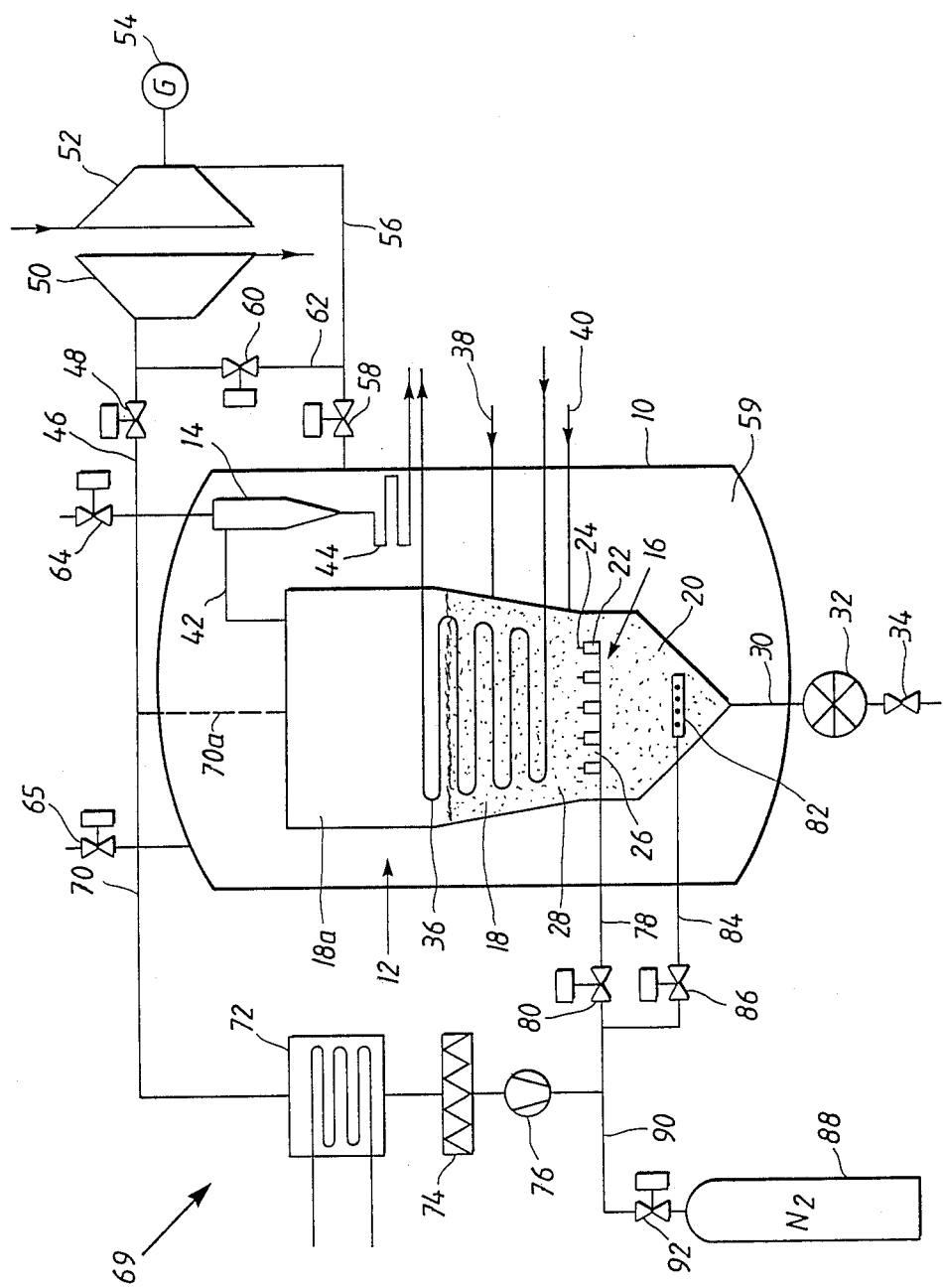

METHOD AND A DEVICE FOR COOLING OF A PFBC POWER PLANT AFTER A GAS TURBINE TRIP

TECHNICAL FIELD

The invention relates to a method and a device for removing heat from the bed material of a combustor after an operational disturbance in a PFBC power plant involving a gas turbine trip (shutdown of a gas turbine). (PFBC are the initial letters of the English expression Pressurized Fluidized Bed Combustion.) An operational disturbance may, for example, arise in the event of a load drop out. In case of such a disturbance, a valve in a hot gas conduit, which supplies a gas turbine with propellent gas, and a valve in an air conduit from a compressor, which is driven by the turbine and supplies the plant with compressed combustion air, are shut off. At the same time, a valve in a by-pass conduit between the propellent gas conduit and the air conduit is opened, thus obtaining a direct communication between the turbine and the compressor. By isolating the gas turbine unit from the combustor, racing of the turbine and the compressor is prevented.

BACKGROUND ART

When the operational disturbance remains, the pressure has to be reduced by removing combustion gases from the combustor and compressed combustion air from a pressure vessel surrounding the combustor.

Pressure reduction may, for example, be effected by simultaneous reduction of the pressure in the combustor and blow-off of combustion air from the pressure vessel to the atmosphere, such as described in U.S. Pat. No. 4,744,212 (Anderson et al) or in some other way.

When reducing the pressure in this way, the temperature of the bed material is insignificantly reduced and must be additionally cooled down to a temperature which eliminates the risk of sintering together of bed particles, or to room temperature. At temperatures above about 600° C. and at the presence of oxygen, the fuel present in the bed involves a risk of the formation of carbon oxide for explosion.

SUMMARY OF THE INVENTION

According to the present invention, after a gas turbine trip and isolation of the gas turbine and the compressor from the combustor and the pressure vessel, respectively, the bed is cooled by gas in a closed circuit. The combustor, a gas cooler and a compressor or a fan are included in this circuit. Nitrogen gas can be supplied to this circuit or be supplied directly to the combustor so that a substantially oxygen-free cooling gas is obtained.

BRIEF DESCRIPTION OF THE DRAWING

The invention will be described in greater detail with reference to the accompanying single FIGURE of the drawing.

DESCRIPTION OF THE PREFERRED EMBODIMENT

In the FIGURE, 10 designates a pressure vessel, 12 a combustor and 14 a gas cleaner, symbolically represented by a cyclone, enclosed within the pressure vessel 10. Only one cyclone 14 is shown, but in reality the cleaning plant comprises a plurality of parallel groups of series-connected cyclones. The combustor 12 is divided by an air-distributing bottom 16 into an upper combustion space 18, the uppermosst part of which forms a freeboard 18a, and a lower ash chamber 20. The bottom 16 consists of elongated air distribution chambers 22 with air nozzles 24. Gaps 26 are provided between the chambers 22. The combustion space 18 of the combustor 12 contains a fluidized bed 28 of particulate material. Consumed bed material and ashes formed in the combustion space may pass through the gaps 26 into the ash chamber 20 and be removed via the conduit 30 with the material sluice 32 and the valve 34. The combustion space 18 comprises tubes 36 which cool the bed 28 and generate steam for a steam mixture (not shown). Fuel and fresh bed material are supplied to the bed 28 through the conduit 38 and the conduit 40, respectively.

Combustion gases generated in the bed 28 are collected in the freeboard 18a and are led from there via the conduit 42 to the cyclone 14. Separated dust is removed via a pressure reducing discharge device 44. Cleaned gas is conducted in the conduit 46 with the cut-off valve 48 to the turbine 50. The turbine 50 drives the compressor 52 and the generator 54. Compressed combustion air is conducted in the conduit 56 with the cut-off valve 58 into the space 59 between the pressure vessel 10 and the combustor 12. Air from here is distributed to the nozzle 24 via the air distribution chambers 22, fluidized the bed material and burns the fuel in the bed 28.

In the event of an operational disturbance involving a gas turbine trip, the turbine 50 and the compressor 52 are isolated from the combustor 12 and the space 59, respectively, in the pressure vessel 10 by the valves 48 and 58 being shut. At the same time, the valve 60 in the by-pass or short-circuit conduit 62 is opened. The pressure in the combustor 12 and in the pressure vessel 10 can be reduced to atmospheric level by blowing off the combustion gases through the blow-off valve 64 or by leakage through the valve 48 and simultaneous blow-off of air from the space 59 via the valve 65. In case of a gas turbine trip, the combustion in the bed 28 can be rapidly interrupted by supplying inert gas, preferably nitrogen gas, to the bed 28 through the fluidization nozzles 24.

The heat content in the bed material in the bed 28 is so large that it is insignificantly cooled by the gas passing through the bed when reducing the pressure. When the fluidization ceases, the bed 28 collapses (is slumped) whereby the tubes will be located completely or partially above the bed 28 and no longer absorb heat from the bed material and cool it. At a high temperature the material in the slumped bed 28 may sinter. It is therefore important to rapidly cool the material to a temperature below 600° C. When the plant is shut down, it may be desirable to rapidly cool the plant to room temperature.

The power plant comprises a closed cooling circuit 69. This comprises a conduit 70, which is connected to the conduit 62 from the cyclone 14, or directly to the combustor 12 as indicated by the dashed line 70a, a cooler 72, a filter 74, a compressor or fan 76, and a return conduit 78 which is connected to the air distribution chambers 22. The conduit 78 includes a cut-off valve 80. A cooling gas distributor 82 in the ash chamber 20 is connected, via the conduit 84 with the valve 86, to the conduit 78. A nitrogen gas container 88 is connected, via the conduit 90 with the valve 92, to the conduit 78.

After a gas turbine trip, the bed 28 and the material in the ash chamber 20 can be cooled by gas which is circulated through the combustor 12 and the cooling circuit 69. The valves 80 and 86 are opened and the compressor 76 is started. At the same time, the valve 92 is opened so that the combustor 12 and the cooling circuit 69 are filled with nitrogen gas and an oxygen-free or oxygen-poor cooling gas is obtained. The combustion of any residual fuel in the bed 28 and the generation of explosive gas are interrupted. After the filling of the combustor 12 and the cooling circuit 69, a restricted continued supply of nitrogen gas may be appropriate. Cooling gas introduced through the cooling gas distributor 82 and the nozzles 24 passes up through the bed material in the ash chamber 20 and the slumped bed 28 and absorbs heat from the bed material. The hot gas leaving the bed 28 is cooled to a certain extent by the exposed tube 36 above the bed 28 and thereafter in the cooler 72, whereafter the cooled gas is returned to the ash chamber 20 and the combustion space 18.

I claim:

1. A method of cooling a bed material in a bed of a combustor in the event of an operational disturbance in the turbine unit of a PFBC power plant, including the steps of:
   cooling the gas leaving the combustor, in a gas cooler located in a separate closed cooling circuit formed by the combustor, the gas cooler, a gas circulator and conduits forming interconnections therebetween; and
   returning the cooled gas to the combustor.

2. A method according to claim 1, wherein the cooling circuit is supplied with an inert gas so that the combustion of residual fuel in the bed ceases and the generation of an explosive gas mixture is prevented.

3. A method according to claim 1, wherein the combustor is supplied with an inert gas so that the combustion of residual fuel in the bed ceases and the generation of an explosive gas mixture is prevented.

* * * * *